United States Patent [19]
Burger

[11] 3,749,131
[45] July 31, 1973

[54] END PLUG ASSEMBLY FOR PIPE
[75] Inventor: Edwin M. Burger, Walnut Creek, Calif.
[73] Assignee: Oliver Tire & Rubber Company, Oakland, Calif.
[22] Filed: July 21, 1971
[21] Appl. No.: 164,534

[52] U.S. Cl............ 138/89, 4/295, 220/24.5
[51] Int. Cl............ F16l 55/10, A47k 1/14
[58] Field of Search............ 138/89, 92; 24/24 B, 24/24.5; 4/295

[56] References Cited
UNITED STATES PATENTS

| | | | |
|---|---|---|---|
| 3,291,156 | 12/1966 | Carsano | 138/89 |
| 3,295,712 | 1/1967 | Peterson | 220/24.5 |
| 3,494,504 | 2/1970 | Jackson | 138/89 X |
| 3,618,809 | 11/1971 | Martino | 220/24.5 |
| 3,667,640 | 6/1972 | Marrow | 220/24.5 |

FOREIGN PATENTS OR APPLICATIONS
1,804,952  6/1970  Germany ............ 138/89

Primary Examiner—Herbert F. Ross
Attorney—Owen, Wickersham & Erickson

[57] ABSTRACT

A plug assembly for sealing the open end of a pipe such as an unused lateral of a fluid conduit comprises a circular sealing member of elastomeric material supported between a pair of washer plates of different diameters. Means are provided for holding the washers in place and for drawing them together to compress the sealing member. When the washer plates are drawn together the sealing member is caused to deform and bulge outwardly to form a sealing peripheral contact with the inner pipe wall.

2 Claims, 2 Drawing Figures

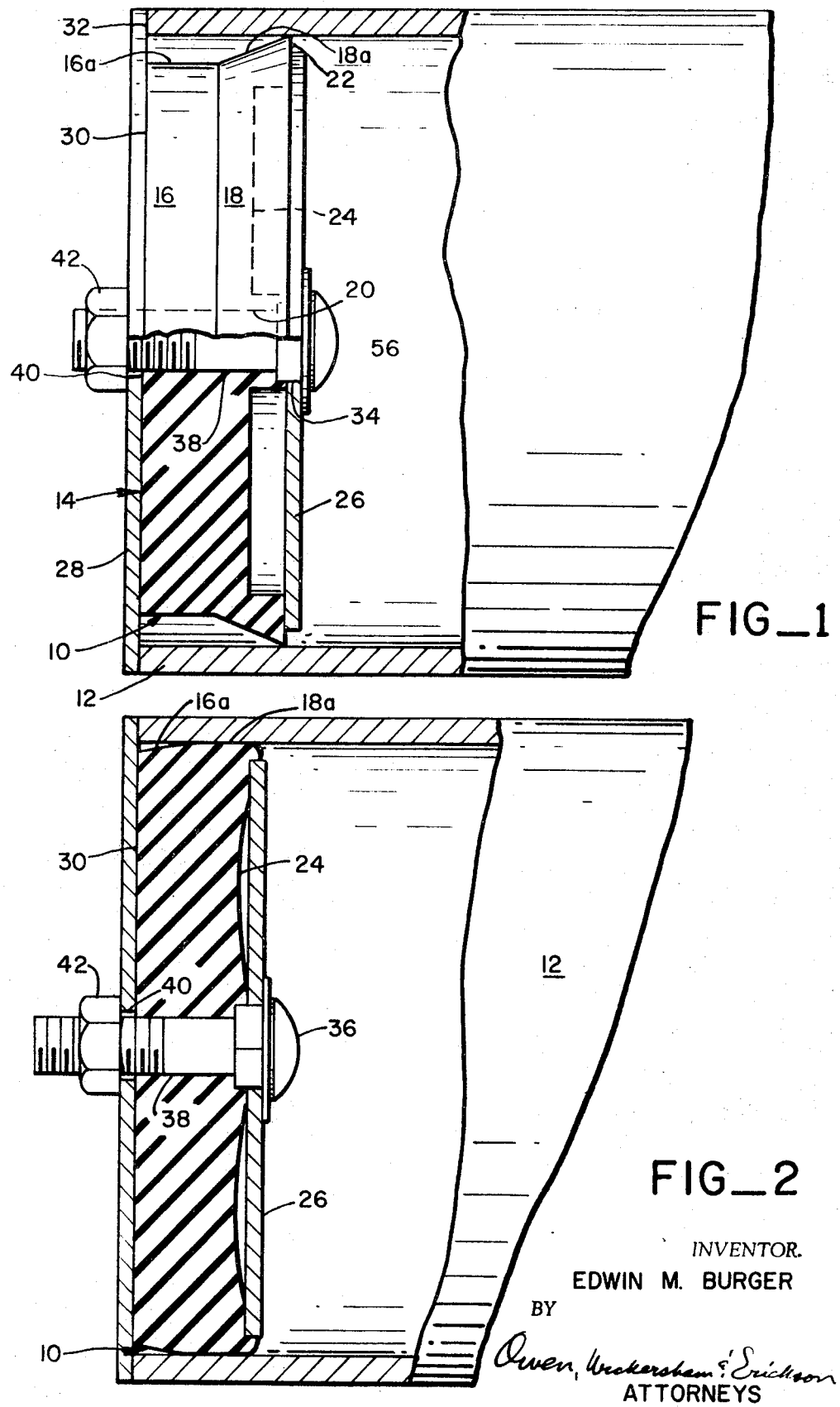

END PLUG ASSEMBLY FOR PIPE

This invention relates to an improved plug assembly for sealing the ends of pipes and the like.

In the construction of fluid conduit systems such as underground water or sewage systems it is usually necessary to provide branching laterals from the main line at predetermined intervals. Often the laterals are provided for connection with facilities that will be installed at some later date, and it is therefor necessary to temporarily seal the lateral until it is ready for use. Heretofore, various forms of plug devices have been utilized. In some instances plugs made of plastic have been used satisfactorily where they form an interference fit with metal pipe and can be driven into the pipe. Here, these plastic plugs must be made to precisely the right size and when they are removed they are generally destroyed and cannot be reused. Such plastic or other preformed plug members cannot be used with concrete pipe of the type commonly used for sewer lines because the size tolerances of concrete pipe usually prevent a firm fluidtight interference fit. Hence, prior to the present invention the most common method for temporarily plugging concrete pipe laterals was to use cast concrete to fashion a plug. Such concrete plugs were held in place by strapping which required time to install and thereby increased costs.

A general object of the present invention is to provide a plug device for conduit laterals and the like that solves the above mentioned problems and particularly one that requires less time and expense to install.

Another object of the present invention is to provide a plug device for temporarily sealing the ends of pipes and one that will provide a durable fluid-tight seal even for pipes that may vary within a relatively wide dimensional range from their nominal size.

Yet another object of the present invention is to provide a plug device that can be installed or removed easily and quickly and can be reused two or more times.

The aforesaid objects are accomplished by a plug assembly which, according to my invention, comprises a circular sealing member of rubber or rubber-like material having a generally cylindrical portion considerably smaller in diameter than the inside pipe diameter and an integral inner conical portion that flares to a diameter approximately equal to that of the pipe. An annular recess is formed on the inner face of the conical portion. A pair of circular washer plates are positioned on opposite sides of the sealing member including an inner plate having a smaller diameter and an outer plate having a larger diameter than the sealing member and the inside diameter of the pipe being plugged. A bolt having a head end supported in the smaller washer plate extends axially through the sealing member and through the larger washer plate. When a nut on the bolt which bears against the larger washer plate is taken up, the two washer plates are drawn together to compress the sealing member. Because of the annular recess on the inner face of the sealing member the compressive force exerted by the washer plates causes its rubber-like material to bulge outwardly radially against the inner wall of the pipe within which the plug device is installed. This bulged out circular surface not only forms an effective fluid-tight seal but serves to lock the plug in place so that fluid pressure within the pipe cannot push it out.

Other objects, advantages and features of my invention will become apparent from the following detailed description of one embodiment thereof, presented in conjunction with the accompanying drawings, in which:

FIG. 1 is an enlarged view in elevation and in section of my plug device as it appears when initially installed in the end of a pipe; and FIG. 2 is a view similar to FIG. 1 showing the plug device in the locked or sealing position.

The present invention is particularly useful on conduits such as sewer lines having extending laterals which eventually will be utilized to service additional housing units. On such conduits each lateral must be temporarily plugged until it needs to be connected to another conduit line. As shown in FIG. 1, a plug assembly 10 according to my invention is installed in a typical pipe lateral 12 for accomplishing this function. Generally, it comprises a deformable sealing member 14 which is formed from rubber or some rubber-like elastomeric material. The rubber should have a medium hardness of around a 40 durometer so that it will flow elastically and exert radial pressure when axial compressive forces are applied. To achieve this flow and the desired radial forces the sealing member has at one end a cylindrical portion 16 with a cylindrical surface 16a which is integral with a conical inner portion 18 having a conical surface 18a. A central passage 20 extends through both portions along the axis of the sealing member. On the inner side or face 22 of the conical portion of the sealing member is an annular recess 24 that is concentric with the passage 20.

Adjacent the deformable sealing member 14 on opposite sides thereof are a pair of washer-like circular plates 26 and 28 of different diameters made from some material such as sheet metal having a uniform thickness that is sufficient to make the plates rigid. The smaller plate 26 has a diameter somewhat greater than the annular recess 24 so that it overlaps and bears against the face 22 of the inner conical portion 18. The other plate 28 has a substantially greater diameter than the inner plate 26 so that it covers completely the entire outer face 30 of the sealing member's cylindrical portion 16. Moreover, this outer plate 28 is larger than the central member so that it will bear against the end face 32 of the pipe 12 on which the plug assembly 10 is installed.

Centrally located on the inner plate 26 is a square hole 34 adapted to receive the head end 36 of a carriage bolt 38. The threaded shank of this bolt extends through the passage 20 in the sealing member 14 and an opening 40 in the outer plate 28, and engaged with the bolt is a standard nut 42.

The sealing and locking action of my plug assembly 10 may be readily illustrated by reference to FIGS. 2 and 3. Initially, it is loosely assembled so that the washer plates 26 and 28 are held against the sealing member 14 but are causing no distortion of it. In this condition, the assembly can be placed with the end of the pipe lateral 12 until the outer washer plate 28 bears against its end face 32. Now, by taking up on the nut 42 the inner or smaller plate 26 is drawn toward the large plate 28. As this occurs the compressive forces of the two plates on the central member cause the rubber material of the sealing member 14 to flow elastically to a new shape. As shown in FIG. 2, the inner washer plate 26 acts against the annular face portion 22 of the sealing member in such a manner that the conical surface 18a and the adjacent cylindrical surface 16a bulge radially outwardly to bear tightly against the inner wall of the pipe 12. This newly shaped bulged out surface has a sealing action much like a conventional O-ring. The more take-up applied to the nut 42, the more sealing action and radical sealing pressure that is achieved. Eventually, the plug assembly becomes firmly locked in place so that it cannot be dislodged even by excessive abnormal internal pressure.

As described, the present invention provides a plug assembly that will accommodate a range of pipe sizes and is relatively simple in construction. Yet, it can be easily installed without extra tools or skilled labor and it can be removed when it is timed to connect the lateral with another conduit.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A plug assembly for sealing the open end of a pipe having an annular end face, comprising:

a circular sealing member of elastomeric material having a first portion with a cylindrical surface and an integral second portion with a continuous conical surface that flares outwardly from said cylindrical surface of said first portion to a greater diameter at the innermost end of said second portion, a transverse inner end face at the large end of said conical portion having an annular cavity surrounding and concentric with a central passage through the axis of said sealing member;

a rigid inner plate contacting said inner end face of said sealing member having a diameter slightly greater than the outer diameter of said annular cavity therein but less than said greater diameter of said conical surface so that a small conical portion of said second portion of said sealing member extends radially outwardly beyond the periphery of said inner plate;

a rigid outer plate adjacent to and having a diameter greater than said cylindrical portion of said sealing member and large enough to abut against the end face of the pipe;

and means attached to said inner plate and extending through said sealing member and said outer plate for drawing said plates together so as to cause said conical and cylindrical surfaces to distend and form a radially outwardly extending surface having a diameter greater than the normal diameter of said sealing member which will engage and form a fluid tight seal against the inner wall of the pipe within which the assembly is installed.

2. The plug assembly as described in claim 1 wherein said means for drawing said plates together comprises a carriage bolt having a head end seated in said inner plate and a threaded end that extends axially through said outer plate, and a take-up nut on said threaded end.

* * * * *